March 17, 1931.  E. L. FICKETT  1,796,515
MACHINE FOR PRODUCING SPIRAL BEVEL GEARS
Filed March 31, 1926  8 Sheets-Sheet 6
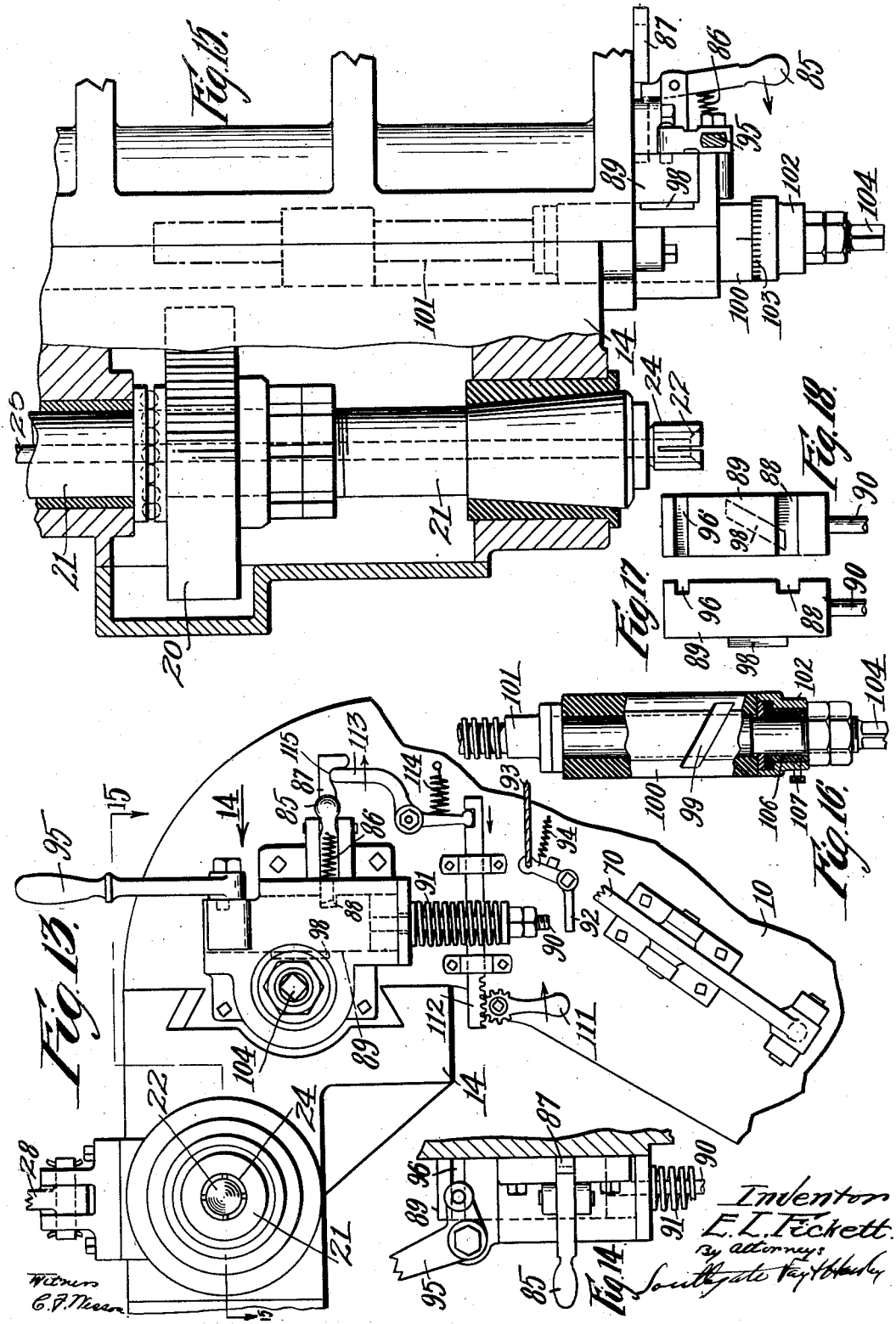

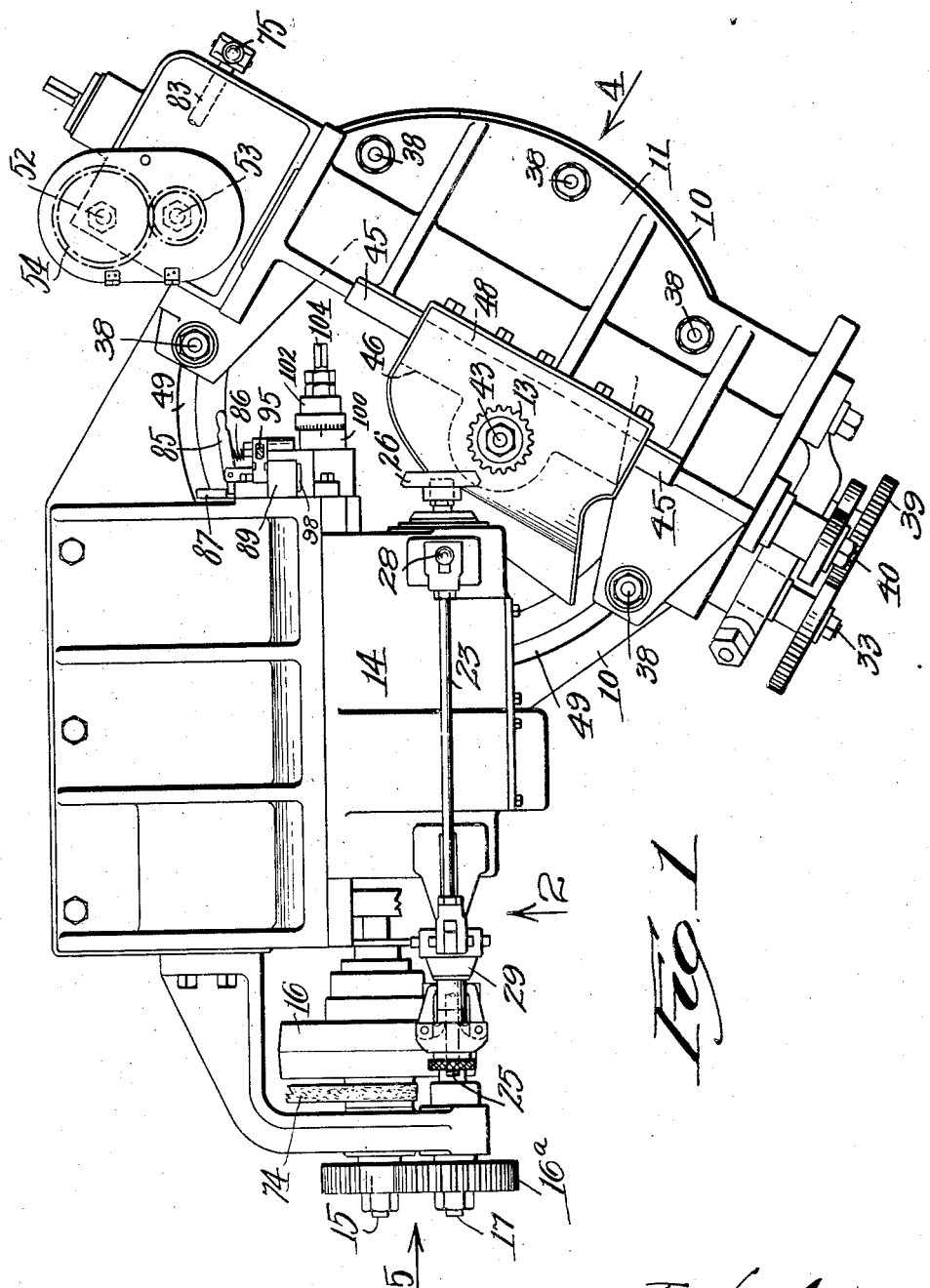

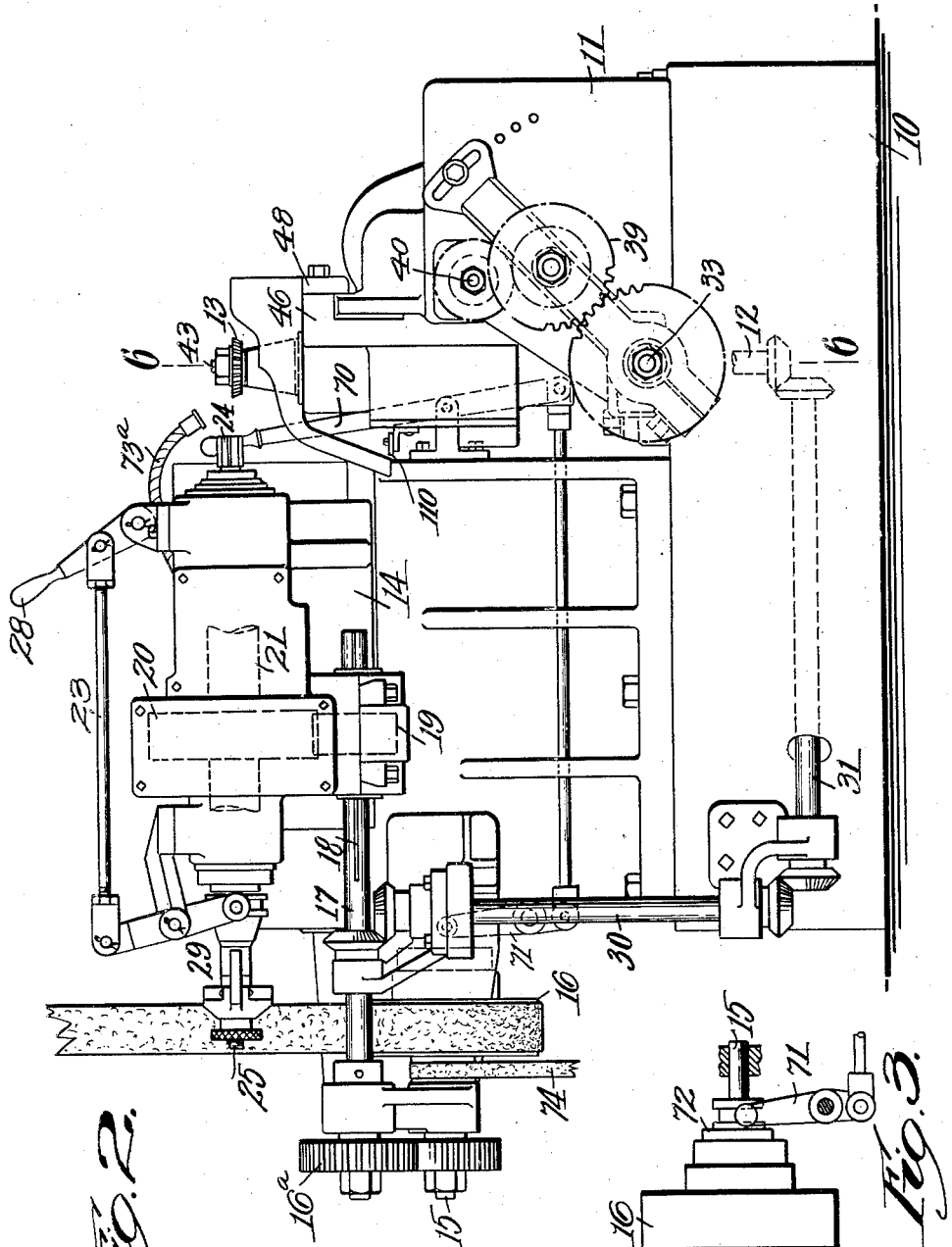

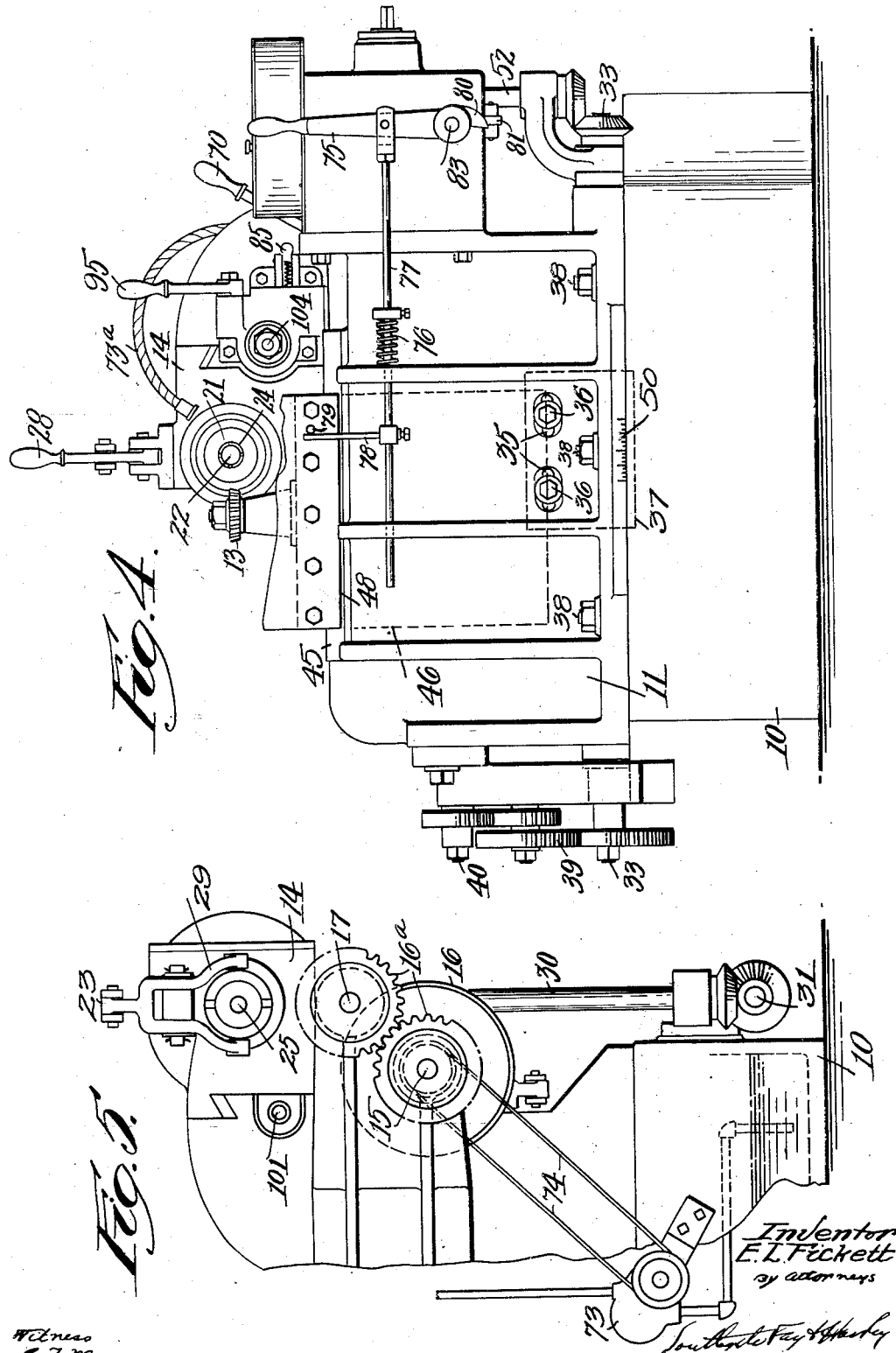

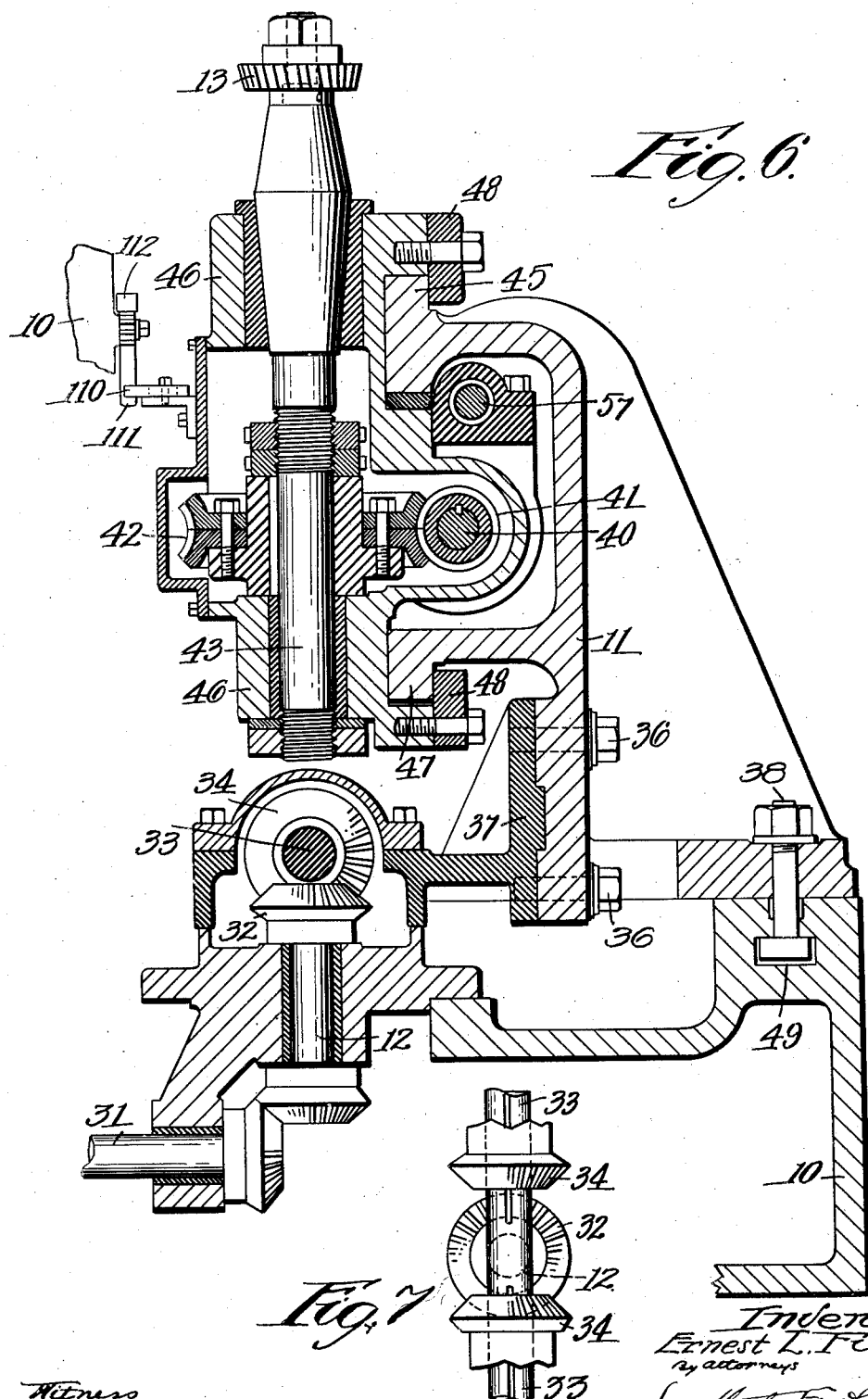

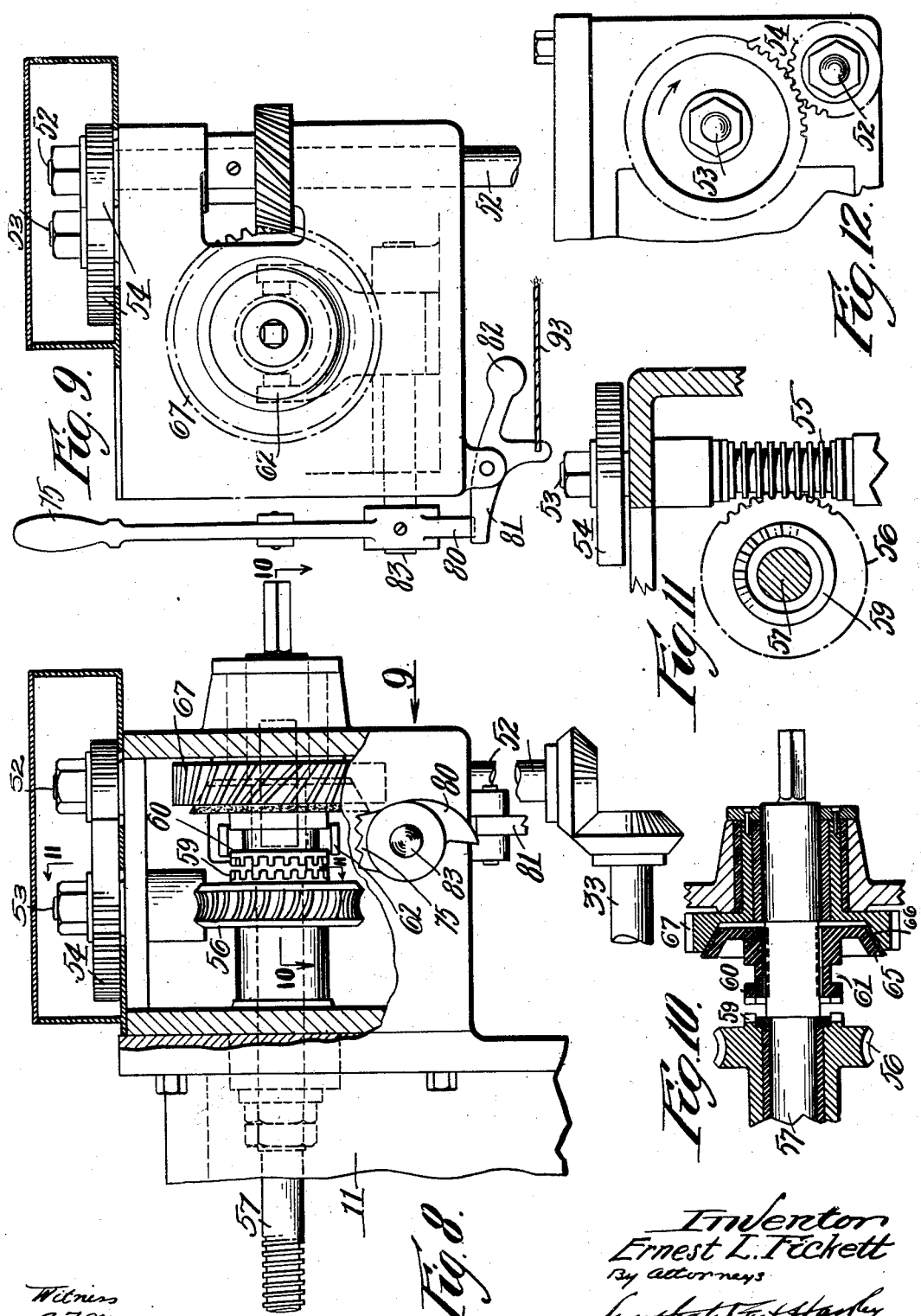

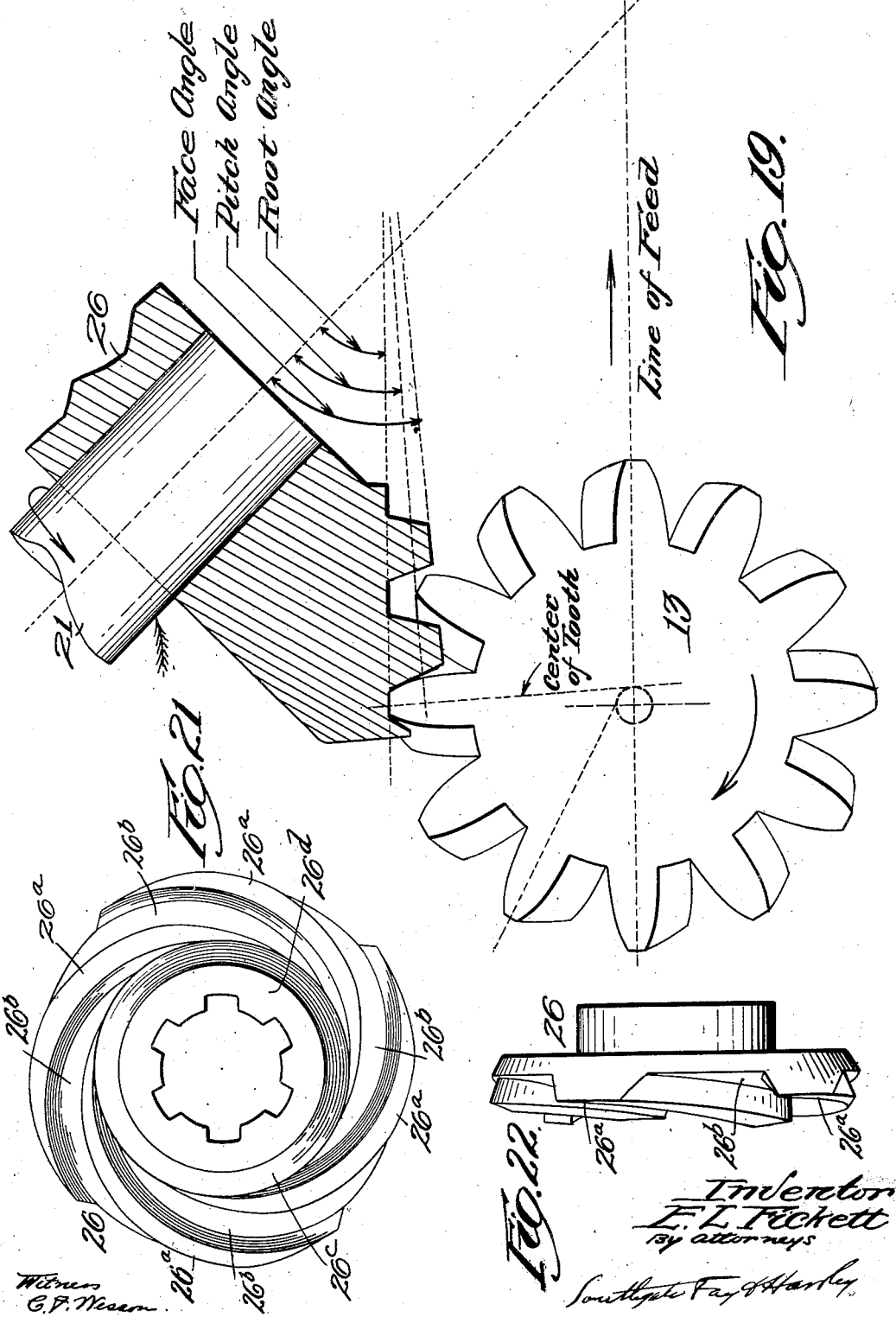

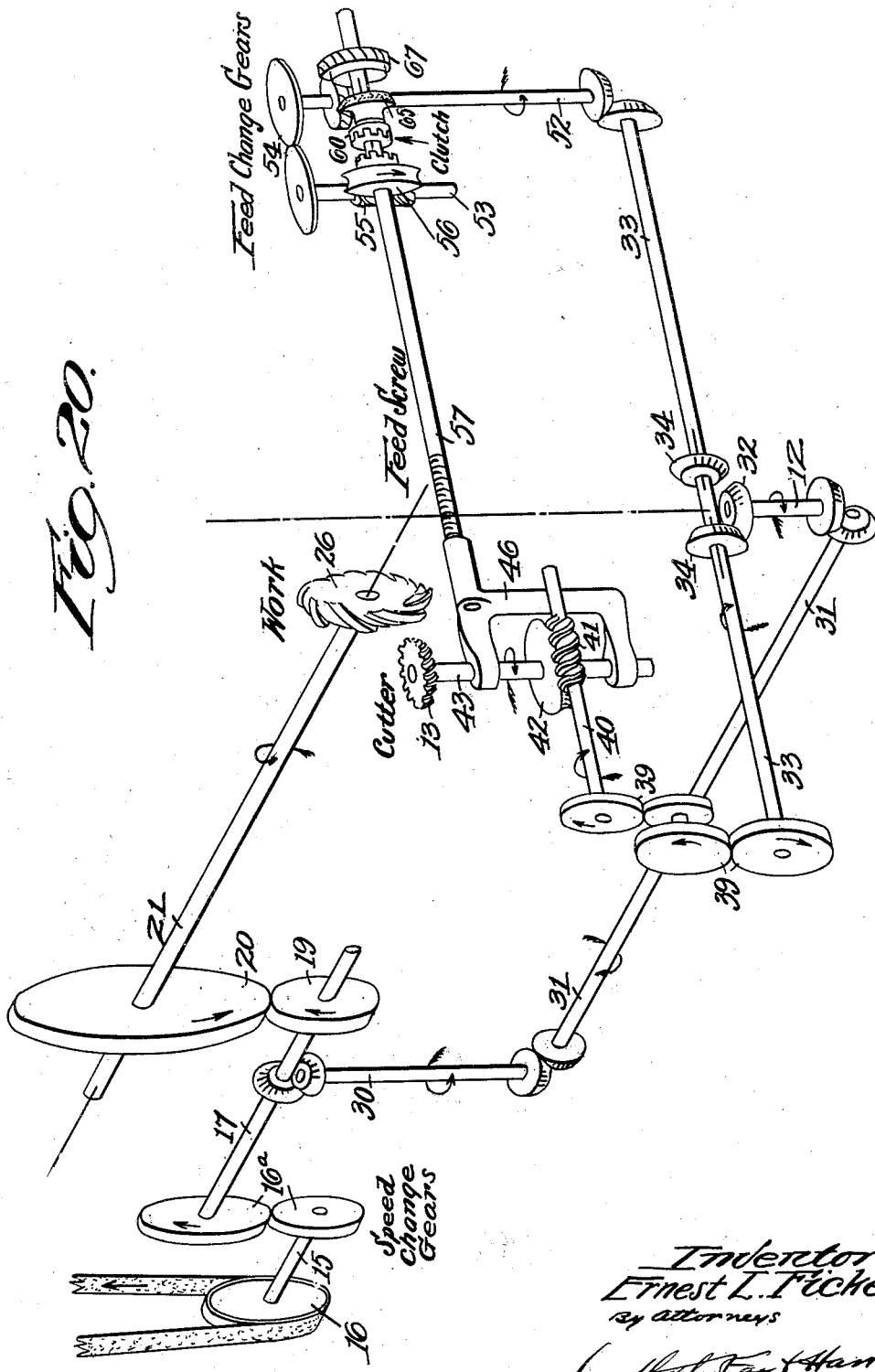

Patented Mar. 17, 1931

1,796,515

UNITED STATES PATENT OFFICE

ERNEST L. FICKETT, OF FITCHBURG, MASSACHUSETTS, ASSIGNOR, BY MESNE ASSIGNMENTS, TO SCURLOCK GEAR CORPORATION, A CORPORATION OF NEW YORK

MACHINE FOR PRODUCING SPIRAL BEVEL GEARS

Application filed March 31, 1926. Serial No. 98,901.

This invention, although containing features capable of general use, is especially designed for producing a form of gear of the spiral order, comprising teeth disposed on the surface of a truncated cone, the pitch of which teeth, measured along an element of the cone, is designated as "conical pitch", the line of each tooth being at a progressive angle to the elements of the cone and the average angle of the teeth, the conical pitch and the major diameter of the cone being interfunctional. A section of the teeth measured along an element of the cone is substantially a rack in shape with the teeth inclined toward the apex of the cone. Mating gears of this system must have curved teeth having angles of the opposite hand in order to intermesh. This machine is designed to cut either one of a pair of meshing gears of the nature above described. It is capable of general use, as stated, to cut spiral bevel gears as commercially used for transmitting power, and will cut them with mathematical accuracy.

More specifically this machine is made to cut the gears shown and described in the pending application for patent to Lewis H. Scurlock, Serial No. 61,415, filed Oct. 9, 1925, and gears of that general nature. The problem to be solved in cutting this type of gear is to produce a curve of the spiral order located on the face of a cone. To do this the gear blank is rotated at a constant speed in a stationary position. A shaped cutter is provided which is rotated slowly on an axis at right angles to the axis of the gear blank so that its teeth will successively cut a small chip on the gear blank. The cutter is arranged for its teeth to be in cutting action only a very short time individually so that during a rotation of the cutter the teeth have several times as much time to cool off during the rotation of the cutter as they have to get heated up in contact with the work. Furthermore it is necessary for the cutter blank and work to have a relative movement in a straight line in the direction of the root angle of the teeth to be produced. This can be accomplished by the movement of the work, but in the present instance I have shown the invention embodied in a form in which it is accomplished by the motion of the cutter.

The invention involves many other features in addition to the main idea expressed above. It includes the organization of the parts so that the cutter will rotate uniformly and move in a forward manner in a uniform direction and the work will rotate uniformly in a definite ratio to the motion of the cutter or vice versa. The invention involves means whereby the cutter, having been fed forward on its cutting stroke, will automatically move back at a higher speed to a position to commence to cut another gear; means whereby a single traverse of the cutter across the face of the work will result in the cutting of an entire gear; means whereby the machine can be set up to cut any number of conical gears and then, by a simple change, can be set up to cut the other gear of the pair by motion of the cutter on its working stroke in the opposite direction and by changing the cutter and reversing its direction of rotation without other change in the reversing and traversing devices; the provision of means whereby the guide for the traverse of the cutter can be turned to any desired angle to cut gears having different angular faces without interfering with the driving connections or disconnecting them from each other or even interfering with the adjustment; the provision of an improved way of transmitting the power of a center shaft, about which the support for the gear cutter traversing guide is adapted to be adjusted, to the cutter so as to operate the same while it is bodily moving along said guide, and the provision of improvements in the means for holding the work whereby the work can be clamped in position for operation very readily and removed instantaneously, and the retraction of the work blank to draw it away from the cutter automatically at the end of the working stroke.

Various means for adjusting the different parts for securing a different tooth ratio, angle, and shape of teeth are included in this invention.

It will be understood that many features of the invention are capable of use in the cutting of gears of different types than the one described and to that extent the invention is not limited to that particular gear or type of gear.

The invention also includes the new method of cutting gears and a novel cutter.

Other objects and advantages of the invention will appear hereinafter.

Reference is to be had to the accompanying drawings in which

Fig. 1 is a plan of a machine constructed in accordance with this invention for the cutting of a gear as above described;

Fig. 2 is a side view of the same showing the guide for the cutter arranged at right angles to the main axis of the machine instead of at a working angle, such as shown in Fig. 1;

Fig. 3 is a side view of a detail;

Fig. 4 is an end view of the machine looking in the direction of the arrow 4 in Fig. 1;

Fig. 5 is a view of the opposite end of the machine as indicated by the arrow 5 in Fig. 1;

Fig. 6 is a central sectional view through the cutter shaft when in a central position on the line 6—6 of Fig. 2;

Fig. 7 is a plan showing the method of reversing the feed for the purpose of changing the stroke on which the cut is made;

Fig. 8 is a side view, partly in section, of the mechanism for controlling the reversing of the shaft that feeds the cutter along the work;

Fig. 9 is an end view of the same looking in the direction of the arrow 9 in Fig. 8;

Fig. 10 is a sectional view of a part of the same on the line 10—10 of Fig. 8;

Fig. 11 is a sectional view on the line 11—11 of Fig. 8;

Fig. 12 is a plan of the same;

Fig. 13 is an end view of the head stock;

Fig. 14 is a rear view of part of the same, as indicated by the arrow 14 in Fig. 13;

Fig. 15 is a horizontal sectional view on the line 15—15 of Fig. 13;

Fig. 16 is a rear view, partly in section, of the sliding sleeve for the work adjusting screw;

Figs. 17 and 18 are end and side views respectively of the operating slide therefor;

Fig. 19 is an enlarged plan with the work in section showing the cutting operation as performed by this machine;

Fig. 20 is a perspective view of the driving connections, diagrammatical in form, but not showing the support or various adjusting means connected with these parts;

Fig. 21 is a face view of one form of the product of this machine; and

Fig. 22 is an edge view of the same.

As stated, this machine is capable of use for producing other gears, or at least features of it are capable of being embodied in machines for cutting other gears. The machine as a whole is designed for producing the type of gear illustrated in Figs. 21 and 22, which illustrations are taken from the said Scurlock application. That gear is designed as one of a set of differential gearing comprising two opposite conical gears 26 like the one shown, and two compensating pinions intermeshing with them to produce a differential occupying the same space as an ordinary bevel gear differential. Of course, the gear illustrated is for a differential comprising two pinions only, but when three pinions or any other number are used the same principles will apply.

In the Scurlock case the teeth of these gears mesh with each other in such a way, and are of such shape and construction, that a differential of a so-called self-locking type can be provided without resorting to the old expedient of securing the desired effect by the friction of the pinions on their end seats.

A similar result is secured in another way. Scurlock's gears 26 are provided with teeth $26^a$ which are adapted to mesh with the corresponding teeth on the pinions or compensating members. They so confine the latter that they are compelled to travel in a circular path around the axes of the axial sections when differential action takes place, and provide an interlocking connection between the differential members of such a nature that no end thrust is imparted by the compensating members to the carrier or housing on which they are rotatably mounted. Instead of this the teeth are located in lines substantially transverse to those axes, so that any possible end thrust set up in the compensating differential members is received mainly by the interlocking teeth of the intermeshing differential members secured to the axle sections or carrier from the transmission shaft. The teeth of the rotatable compensating members carried by the housing interlock with the teeth of the differential members secured on the axle sections in such a way that the two axle sections are driven at a substantially equal velocity, regardless of the resistance encountered by the two supporting wheels, and of any difference in this resistance. That is, if one of the rear wheels of an automobile equipped with this differential member slips while the other has perfect traction, the latter wheel will be driven at substantially the same speed as the freely rotating or slipping wheel.

The teeth $26^a$ on the member 26 are separated from each other by intervening grooves $26^b$ and each is provided with a circular groove $26^c$ around the hub $26^d$ and the spaces $26^b$ between the teeth communicate with this circular groove $26^c$. It will be seen that the teeth $26^a$ are formed on a beveled or conical face of the differential wheel 26. Their outer faces are inclined with respect to the axis of the differential member somewhat in the manner of the inclination of bevel gear teeth. The teeth 26$^a$ themselves, however, are directed substantially transversely to the radii of the differential members 26, and the teeth of the compensating member or pinion are of the same character, but, of course, on a different cone and they are oppositely directed. Thus any force set up in the compensating members in the direction of their own axes is directed substantially transversely to the teeth 26$^a$ of the differential members 26. Thus, the so-called interlocking effect is produced and the thrust on the compensating members is received entirely or mainly by the members 26, not imparting any material force to the carrier or housings in which the compensating members are mounted.

The recesses between the teeth 26$^a$ are of the same width in cross section throughout and the same is true of the spaces and teeth for the compensating members or pinions. The spaces 26$^a$ form a composite continuous pathway around the axis of the gear 26 for the travel of the compensating members when the differential action takes place. This continuous pathway is provided by reason of the fact that the spaces 26$^b$ substantially overlap so that when, or before, one tooth of the compensating member reaches the end of one of the grooves 26$^b$ another tooth of the compensating member enters another one of the spaces 26$^b$.

It will be understood, of course, that the axes of the gears 26 are at right angles to the axes of the compensating members or pinions as usual. Also the teeth of the two meshing members are of the same length. The number of teeth employed may vary, depending on the number of compensating differential members that may be employed.

It will be seen, therefore, that referring to Figs. 21 and 22 the teeth 26$^a$ are of the spiral order, but that they are not true spirals, because they are not drawn in a plane surface but on a cone. That is what I mean by teeth of the spiral order. As will be seen, when cut on this machine as illustrated, the teeth are conical Archimedean spirals.

In referring to this gear or to the compensating member, the pitch of the teeth is measured along an element of the cone, or at least, I have chosen to measure it in that way, and I call this the conical pitch. The average angle of the teeth as I have called it is the angle of the teeth measured at the center of each tooth, that is, one-half way between the ends of the tooth. Now this average angle, conical pitch, and the major cone diameter are interfunctional. If two of them are determined, the third will be found by calculation.

The machine which is the subject of the present invention is capable of cutting both the gear 26 which is illustrated herein and the compensating gear or pinion that meshes therewith. Although it is described with special reference to the cutting of the gear 26, it is to be understood that practically all the description except as to the direction of the rotative and translational motion of the cutter and its position applies also to the cutting of the pinion.

As a preliminary to the detailed description of the machine, I will describe the general organization thereof as indicated chiefly in Fig. 20, with reference to Fig. 19 also. The machine is shown in Fig. 20 in diagrammatic form with many of the details omitted but illustrating enough to show the motions required for making one of the gears above described. The machine is shown as having a base 10 provided with an upward extension at the back on which is located, by means of ways on a vertical face of the upwardly extending portion of the base, a head-stock 14. On the base is supported the power shaft 15 provided with a pulley 16 or the like for transmitting power to it from a suitable source. This shaft 15, through change speed gears 16$^a$, drives the main shaft 17 of the machine. The shaft 17 is provided with a long keyway 18 by which it is connected to turn a pinion 19 and to keep its connection with it as the pinion is shifted back and forth with the head stock on which it is mounted. The gear 19 meshes with a gear 20 on the work shaft 21. Through this work shaft extends a rod 25 which is provided with a tapered head 22. An operating mechanism 23 is arranged on the head stock for moving the rod 25 back and forth. This shifts the head 22 in a split internal arbor 24. The tapered head 22 operating in this arbor causes it to grip the inside of the work blank 26. See Figs. 1, 2 and 15.

It will be clear, therefore, that the gear blank 26 is held on the shaft 21 by the mechanism 23, and this shaft rotates constantly as long as the power is on the power shaft through the drive pulley. The operating mechanism 23 is worked by the handle 28 and it involves an adjustable cone and lever thrust construction 29 adapted to draw back the rod 25 when the handle 28 is pushed backward. This clamps the work.

The gear 20 is provided with an antifriction thrust bearing between it and the stationary surface on the head-stock 14, and the shaft 21 is provided with screw-threads for adjustment by means of nuts as indicated. The bearing for the shaft is shown as conical in form, so that any wear can be taken up by the adjustment of the shaft longitudinally.

The parts above described show the way of driving the gear blank 26.

The base 10 is provided with an arcuate horizontal portion on which is swiveled a frame 11 adapted to turn about a central vertical axis represented by vertical shaft 12. This frame supports the cutter 13 on a shaft 43 which is parallel with the shaft 12 and has certain other relationships to it as will appear.

The shaft 17, through bevel gears or the like, drives a vertical shaft 30 which in turn, through bevel gears, drives a horizontal shaft 31 extending into the base of the machine to intersect the axis of the shaft 12 which it drives by bevel gears. This shaft 12 is mounted on the stationary part of the base 10 and constitutes a swivel center or pivot for the swivel frame 11. This shaft 12 has a bevel gear 32 at its upper end and a horizontal shaft 33 extending over it in a direction transverse to that of the shaft 31. The shaft 33 is carried by the frame 11 and provided with two bevel gears 34 located oppositely and each one adapted to mesh with the gear 32 in accordance with their positions on the shaft 33. These gears are held to the shaft 33 by sliding key constructions of well known form. In accordance with the shifting of the gears 34, the shaft 33 will be driven in one direction or the other. This is not an ordinary reversing device because when the machine is set up to cut one member of a pair of meshing conical gears, the shaft 31 will rotate only in one direction and will never be reversed until the machine is to be set up to cut the other member of the pair of gears. Therefore no quick acting means need be provided for this shaft and the only means I have shown consists in the provision of a pair of slots 35 in the swivel frame 11 and fastening bolts 36 for fastening a frame 37 thereto in either one of its extreme positions. The frame 37 carries the two pinions 34 and its adjustment determines the direction of feed.

The shaft 33, through speed change gearing 39, drives a shaft 40 which is provided with a worm 41 meshing with a worm wheel 42 mounted on a vertical cutter shaft 43. This cutter shaft is located directly over the shaft 12 in one of its positions but it is moved laterally and it moves in a plane through the axis of the shaft 12. On the top of this shaft 43 is the cutter 13. The cutter 13 which is shown in plan in Fig. 19, is provided with a number of teeth having a certain relationship to the number of teeth on the gear to be cut. The relative speeds of the shafts 21 and 43 are in proportion to the tooth ratio. Each of these teeth on the cutter is set at a slight angle, that is, the center line is tangential to a small circle at the center of the cutter. The involute faces of the teeth are also slanted as indicated, because the tooth spaces 26$^b$ on the gear 26 are on an inclination as indicated in Fig. 21. This cutter rotates at a slow rate of speed proportional to the rate of rotation of the shaft 21 and each tooth cuts along the whole length of one of the teeth of the cutter while it is in contact with the blank. Not only is the tooth of the cutter rotating in the direction of the arrow, but the whole cutter is sliding along the line of feed representing the root angle of the gear coinciding with the bases of two or more teeth. The speed of the shafts 21 and 43 has to be modified in the speed change gearing 39 to compensate for the sliding motion. By this compound motion the proper cut is secured and in the case of the gear shown each tooth on the cutter comes into action before the next one ahead has stopped cutting.

For the purpose of moving the cutter shaft 43 the swivel frame 11 and its attachments are provided. On this swivel frame is carried a guide 45 on which is a slide 46 having ways for receiving this guide. This slide 46 is not only supported by the guide 45 at the top, but also by a second guide 47 at the bottom, the guides 45 and 47 constituting part of the swivel frame 11. To hold the slide 46, plates 48 are bolted at the back of the guides 45 and 47 as will be readily understood. Thus the slide 46 is capable of moving along the guide 45. The swivel frame 11 is provided with fastening bolts 38 which enter a circular, or at least arcuate, slot 49 in the bed 10 and this swivel is set so that the guide 45 is parallel with the bottom of the tooth to be cut on the work blank 26. A scale 50 shows its angularity.

For the purpose of automatically feeding the slide 46 along the work, I drive from the shaft 33 a vertical shaft 52, by bevel gearing or any other convenient means, and by this shaft I drive at a higher or lower speed a shaft 53 by feed change gears 54. On the shaft 53 is a worm 55 driving a worm wheel 56 on a screw shaft 57. The screw on this screw shaft 57 enters a nut in the slide or head 46 and moves that slide along its ways in accordance with the speed of the parts. The connections are not quite as simple as just mentioned for on the shaft 57, or rather on the worm wheel 56, there are clutch teeth 59 meshing with corresponding clutch teeth on the sliding collar 60 having a groove 61 as usual and operated by a yoke 62 connected with a handle 75. Then this sliding collar can move back and forth to clutch and unclutch the worm wheel 56 with respect to the shaft 57. At the other end of the collar 60 is a friction conical surface 65 adapted to engage the corresponding surface 66 on a wheel that is keyed to the shaft 57 and is provided with external helical gear teeth 67. This gear meshes with a helical gear on the shaft 52. The cut is made by feeding the slide 46 by the worm 55 and wheel 56. The gears 67 provide the quick return.

*Operation*

I have now described what may be considered the main essentials of this machine, particularly with reference to the diagrammatic view (Fig. 20) but also in some instances referring to the other figures. I will now describe the operation of the machine, stopping at times to introduce descriptions of additional elements that have not been referred to above.

When it is desired to start the machine for the purpose of cutting the gear 26 which is shown in the drawings, the bolts 36 and 38 are loosened, the swivel frame 11 is turned to a position in which the slide 45 and its guiding surfaces are parallel with the line of the roots of the finished teeth. The plane along which the axis of the shaft 43 moves is parallel to a vertical plane tangent to a cone bounded by the roots of the teeth.

Now the bolts 38 are tightened up to fasten the frame 11 with the slide at that angle. The frame 37 carrying the two gears 34 is shifted along until the one on the left comes into mesh with the gear 32 on the shaft 12 to cut a left hand spiral as shown. Then the bolts 36 are tightened up and these parts are left in this position as long as it is desired to produce this gear. The conical blank 26 is placed on the expansible arbor 24 and the handle 28 is pulled forward to draw the rod 25 in the opposite direction and to clamp the work on the arbor. The handle 95 is in position to project the work into operative position as will appear. Either before or after this is done the machine is started by pushing backward a starting lever 70. This, through obvious mechanism, operates a lever 71 and a clutch 72 to clutch the pulley 16 to the shaft 15 on which it normally runs loosely. Now this shaft 15 is connected with the power and it runs the shaft 21 constantly and also the shaft 12, and thereby the shaft 52 as well as the cutter shaft 43. In addition to this the shaft 15 operates an oil pump 73 by means of a belt 74 and distributes oil through a hose 73ª on the work.

The cutter 13 works idly because the clutch lever 75 is standing in neutral position. This lever is now pushed forward which compresses a spring 76 on a rod 77 connected with the lever and moves an arm 78 back away from a stop 79 on the slide 46. The turning of the lever 75 swings a finger 80 on the lever 75 over a latch 81 which is pivoted on an extension of the swivel frame 11. The latch is provided with a weight 82 for normally holding it up in operative position. But now the finger 80 swings over to the side opposite that shown in the drawings. This latch 81 therefore, now held up by its weight, prevents the lever 75 from being shifted back. The shifting of this lever acts, through a shaft 83 on which the lever is mounted, to move the sliding collar 60 so that its teeth engage with the positive teeth on the worm wheel 56 to drive the screw 53 positively.

This screw is driven by these connections in a direction to move the slide 46 along its supports in a direction to bring the cutter into engagement with the gear blank and cut the teeth, that is in a direction toward the upper right hand corner in Fig. 1.

When the blank is all cut, which is accomplished in a very short period, the cutter will be located on the opposite side of the gear blank, the shaft 43 nearly in line with the shaft 21. The slide or carriage 46 will of course be in a position further to the right than that shown in Fig. 4 and Fig. 1.

The next operation is to reverse the screw 57. This can be done by hand by manipulating a handle lever 85. This lever is moved back toward the shaft on which the work is located in opposition to a spring 86. There is a projection on this lever engaging in a slot in a bolt 87, the end of which projects into a groove 88 in a square or rectangular slide 89. At the end this slide has a rod 90 on which is a spring 91, the tension of which is adjustable. This is a strong spring, however, and when the slide 89 is released by the withdrawal of the bolt 87 the spring is free to pull the rod 90 and slide 89 down in Fig. 13. One effect of this is to cause the end of the rod 90 to engage one arm of a bell-crank 92 and pull a cord 93 in opposition to a spring 94. This cord is connected with the weighted trip lever 81 and pulls it down so as to allow the projection 80 on the reversing lever 75 to be freed from the position in which it has been located while the cutter was moving in the forward direction. The result of this is to leave the spring 76 free to push the lever 75 over from its inclined cutting position to the opposite reversing position. This, through the shaft 83 and fork 62 thereon, actuates the clutch 60 to disengage the side 59 and engage the friction clutch 65 on the other side with the shaft 57. The result of this is that the shaft or screw 57 is rotated in the opposite direction through the helical gears and the cutter is moved back rapidly to its original position.

When the cutter gets back to its original position the stop 79 on the cutter slide 46 will engage the arm 78 and pull the rod 77 back. This will bring the reversing lever 75 up to its original neutral position shown in Fig. 4. Now the parts are all ready to be started over again.

When the cutter has made its traverse and completed the cut on the gear blank, it is of course constantly rotating and must be returned to its initial position as explained. In order that it may not touch the completed gear on its reverse motion, this gear is drawn back in an axial direction. For this purpose, this slide 89 has upon it, an angular projection 98 which is located in an inclined slot 99 in a sleeve 100. This sleeve is mounted on a screw shaft 101. The motion of the block 89 vertically causes the projection 98 to act in the slot 99 and move the sleeve 100 and screw 101 back horizontally. This carries with it the nut on the screw 101 and also the head stock 14 which is mounted to slide on its ways.

This sleeve 100 butts against a collar on the screw 101 at one end and at the other end it is provided with a casing 102 having a scale 103 registering with the zero point on the sleeve 100. An adjustment of the screw 101 to any necessary degree of fineness can be secured by turning its end 104 by means of a wrench until the proper position is secured. In the casing 102 is a collar 106 to which is secured by a screw 107 the casing 102 and which is keyed to the shaft of the screw 101.

It has been stated that operation of the handle 85 releases the slide 89 by drawing the bolt 87 out of the groove 88 and allowing the spring 91 to pull the rod 90 down and with it the slide 89. This, of course, has the additional effect of moving the screw 101 and the work back so that the cutter can be returned to normal position without injuring the cut gear.

This mechanism can be operated automatically instead of manually in the following way: On the slide 46 is a projection 110. When this projection reaches a point to engage a gear segment handle or projection 111 it turns that segment, slides a rack 112 and swings a bell crank 113 in opposition to a spring 114. The upper end of this bell crank engages in a notch 115 in the bolt 87 and the movement of the bell crank will retract the bolt. This has the same effect as the movement of the handle 85 in the direction opposite the arrow in Fig. 15. A handle 95 is provided which is shown in Fig. 14 and is really a bell crank provided for restoring the work to operative position. This bell crank has a projection in a groove 96 in the top of the slide 89 so that when the handle is drawn back, this slide will be raised. These operations are performed without disconnecting the work from the power.

To summarize the operation briefly it may be stated that at first with a suitable cutter in position and proper blank fixed on its shaft and projected into operative position, the entire machine is set into operation with the exception of the feed screw 57. Now the clutch lever 75 is turned to rotate the feed screw and carry the cutter past the blank, the cutter rotating all the time on its own axis and always cutting like a lathe tool. At the proper point, the movement of the cutter slide 46 releases the trip latch 81. By the mechanism described this allows the work spindle to recede sufficiently so that when the cutter feeds back it will not engage the cut gear. When the work spindle 21 has receded to the limit of its travel, the rod 90 releases the latch 81, allowing the spring to throw out the clutch from engagement with the feed worm and into frictional engagement to drive the feed screw 57 in the opposite direction and at a higher speed. This traverses the cutter rapidly back to the chosen starting point. There the stop 79 by the movement of the slide 46 pushes the rod 77 in opposition to the spring 76 and moves the clutch lever and thereby the clutch back to neutral position so that the feed screw comes to rest. This completes the cycle and the machine is ready to receive a fresh gear blank.

After the machine has been operated to get as many of these gears 26 as may be desired, the mating spiral pinions for these gears are then cut on the same machine. For this purpose it is necessary to shift the swivel frame 11 around to the complementary angle and to shift the frame 37 along until the right hand gear 34 meshes with the gear 32. This reverses the direction of rotation of the shaft 52 as well as of the shaft 40 and the cutter and the result is that the cutting stroke is taken on the left hand traverse of the slide 46. In this case, when the clutch teeth 59 are engaged, the cutter is fed at the proper speed to cut the small conical gear blank (not shown) but located on the shaft 21. It will be understood that in the cutting of the pinions of the Scurlock differential, a different cutter will be required which is right hand with respect to the left hand cutter used on the gear. Also the change speed gearing 39 should be modified in accordance with the difference in the number of teeth on the pinion as compared with those on the gear or the same result might be obtained by the use of a cutter having a smaller number of teeth. At the completion of the cut, the positive clutch is disengaged from the feed worm and the friction clutch 65 is put into operation all automatically as described above. The work shaft is drawn back as previously described and then the cutter is traversed to a point in front of the end of the work shaft ready to commence over again. The cycle of operations holds good irrespective of the direction of cut.

It may be well to describe the cutter more fully. It, of course, has a definite diameter. Knowing this diameter, I am enabled to determine the portion of a turn through which the cutter will roll or unwrap, upon merely being translated or moved bodily along the line of feed in Fig. 19 a given distance. If I select one inch as this distance and divide it by the circumference of the cutter, I will get directly the portion of the turn or rotation of the cutter used in this unwrapping. As I have pointed out above, the relative rate of rotation between the work blank and the cutter are predetermined by their numbers of teeth. In the form shown, the gear 26 has four teeth and the cutter twelve.

Now, in order to arrive at the proper ratio of gears 39 between the shafts 33 and 40, the number of turns that the work will make during translation of the cutter through its cutting movement across the work, say one inch, is determined from the relation established by the interconnecting gearing and worm drives. Let us assume this to be 200. Now, due to the relation between the teeth on the cutter and those on the finished gear, the cutter, if rotated without translation, should, in the assumed case, receive one-third of the number of revolutions of the blank or, say, 66⅔ revolutions. However, during this operation the cutter, due to the unwrapping action in the course of translation, would turn, say, through two teeth or one-sixth of a revolution. This, then, should be either added to or subtracted from the 66⅔ revolutions, depending upon the direction of translation of the cutter during the active cutting stroke to keep the teeth of the cutter in the proper path along the surface of the blank. As the operation has been described, this amount should be subtracted so that the actual gear ratio between the blank supporting shaft and the cutter shaft should be 200 to 66½ under the conditions assumed. It will therefore be seen that the ratio of the gearing 39 can be worked out in a simple, mathematical manner. This kind of calculation holds good in the case of all gears of this character to be cut on this machine.

I wish it to be understood that this machine is designed particularly for cutting the Scurlock gears and when used for cutting them or any gear on a conical face, the swivel head 11 is turned to some angle different from 90 degrees to the axis of the shaft 21. Scrolls can be cut on the face of a blank by turning the frame 11 at right angles to the work which happens to be the position shown in Fig. 2, that position being chosen in that figure for the purpose of permitting the illustration of the end of the frame 11 without bringing it into perspective. Of course in either of those cases, if the machine were to be used constantly for such purposes, there would not need to be any circumferential adjustment of this frame and much of the mechanism could be omitted. This is mentioned merely as an illustration of the fact that various features of this invention can be used for purposes other than the specific one for which this machine is designed.

When cutting a Scurlock gear with the teeth at a different angle, a different cutter has to be used having teeth at a relatively different angle to the axis of the cutter and of a slightly different outline. When cutting other spiral bevel gears which have curved pressure faces, a cutter must be used having its tooth outlines and angles modified in accordance with the teeth to be cut.

I have described this invention all the way through simply as a machine, but it will be obvious that in doing so I have described a method of cutting gears which is entirely new and I therefore claim that method herein.

Although I have illustrated a specific machine and hinted at simplifications which could be used if only certain parts of the invention were to be used, I am aware of the fact that many other modifications can be made in the machine as shown without departing from the scope of the invention as expressed in the claims. Therefore I do not wish to be limited in these respects, but what I do claim is:

1. In a machine for generating the teeth of a gear, the combination with means for supporting and constantly rotating a conical gear blank, of means for rotating at a constant ratio thereto a gear cutter having a plurality of cutting teeth whose cutting edges are substantially in a plane perpendicular to the axis of the cutter, said teeth being adapted for continuous meshing with the teeth cut thereby, and automatic means for reciprocating the cutter bodily along the conical surface of the gear blank.

2. In a machine for generating spiral gear teeth, the combination with a shaft on which the work blank is fixed and means for constantly rotating it, of a cutter shaft having its axis located at a definite angle to the axis of the first named shaft, means for turning the cutter shaft, and means for moving the cutter shaft bodily at a definite speed ratio with respect to its rotation during the continuous cutting operation along a straight line across the face of the blank to cut teeth of a spiral order.

3. In a machine for generating gear teeth, the combination of a work shaft on which the gear blank to be cut is fixed, means for rotating said shaft constantly, a cutter shaft the axis of which is at right angles to the axis of the work shaft, means connected with the driving means for the work shaft for turning the cutter shaft at a predetermined speed proportionate to the speed of the work shaft and means for moving the cutter bodily, throughout the cutting operation, longitudinally along the face of the work blank in a straight line to produce tooth spaces of constant width throughout their length.

4. In a machine for generating gear teeth, the combination of a work shaft on which the gear blank to be cut is fixed, means for rotating said shaft constantly, a cutter shaft the axis of which is constantly at right angles to the axis of the work shaft, means for turning the cutter shaft, and means for automatically and constantly moving the cutter bodily longitudinally along the face of the work blank to cut teeth of a spiral order, said blank and cutter being in continuous engagement throughout the cutting of the gear.

5. In a gear generating machine, the combination of a work shaft, means for rotating it constantly at uniform speed, a cutter shaft having its axis at substantially right angles to the axis of the work shaft and located at a distance therefrom, means for rotating the cutter shaft at a speed to permit each tooth on the cutter to act in a single tooth space on the work, during a single rotation of the cutter, and means for translating the cutter shaft bodily, at all times while said cutting action is taking place, in a plane in which its axis is located, which plane is at an acute angle to the work shaft.

6. In a machine for generating gear teeth, the combination with a shaft on which the work blank is fixed and means for constantly rotating it, of a cutter shaft having its axis located at an angle to the axis of the work shaft, means for turning the cutter shaft, means for moving the cutter shaft bodily during the cutting operation in a plane at an angle to the axis of the work shaft and parallel to an element of the base cone of the teeth to be cut on the work, means for stopping the traverse of the cutter shaft and means for returning it along the same path at a higher speed.

7. In a gear generating machine, the combination of a work shaft, means for rotating it constantly at uniform speed, a cutter shaft, means for rotating the cutter shaft at a speed to permit each tooth on the cutter to act in a single tooth space on the work during a single rotation of the cutter, means for translating the cutter shaft bodily in a plane in which its axis is located, which plane is at an angle to the work shaft and parallel with an element of the gear to be cut nearest the cutter along the bases of the teeth to be produced, and means for automatically returning the cutter at a higher speed.

8. In a gear generating machine, the combination of a work shaft, means for rotating it constantly at uniform speed, a cutter shaft, means for rotating the cutter shaft at a speed to permit each tooth on the cutter to act in a single tooth space on the work during a single rotation of the cutter, means for translating the cutter shaft bodily in a plane in which its axis is located, which plane is at an angle to the work shaft and parallel with an element of the gear to be cut nearest the cutter along the bases of the teeth to be produced, means for automatically returning the cutter at a higher speed, and means for automatically drawing the cut gear back out of the way before the cutter is returned.

9. In a machine for generating gear teeth, the combination with a shaft on which the work blank is fixed and means for constantly rotating it, of a cutter shaft having its axis located at an angle to the axis of the work shaft, means for turning the cutter shaft, means for moving the cutter shaft bodily during the cutting operation in a plane at an angle to the axis of the work shaft and parallel to an element of the base cone of the teeth to be cut on the work, means for retracting the cut gear, and means for returning the cutter to its starting position.

10. In a machine cutting gear teeth, the combination with means for rotating the gear blank of a toothed cutter, means for supporting said cutter to rotate and in a position with the plane of the cutting surfaces of the teeth of the cutter in the plane of the axis of the work blank, and means operatively connected with said rotating means for traversing the cutter as a whole along the surface of the work blank at an angle to the axis of the blank to control the shape of the teeth cut on the work blank by its rotation past the edges of the teeth of the cutter, whereby teeth of curved formation will be formed having the roots of the teeth located in a conical surface.

11. In a machine for cutting gear teeth, the combination with means for supporting the gear blank to rotate on its own axis, of a toothed cutter, means for supporting said toothed cutter to rotate on its own axis and in a position with the active cutting surfaces of its teeth substantially in the plane of the axis of the work blank so that the teeth of the cutter will cut into the blank after the manner of an ordinary lathe tool, and means for automatically traversing the cutter as a whole in a line at an angle to the axis of the blank along the surface thereof to control the shape of the teeth cut on the work blank by its rotation past the edges of the teeth of the cutter, whereby teeth of curved formation will be formed on a conical surface of the blank.

12. In a machine for cutting gear teeth, the combination with means for supporting the gear blank to rotate on its own axis, of a cutter, means for supporting said cutter to rotate on its own axis, means for traversing the cutter as a whole along the surface of the work blank, whereby teeth of curved formation will be cut on the surface of the blank, a frame on which the cutter supporting means is mounted, said frame having a guide along it for guiding the cutter in its motions back and forth, and means whereby said frame can be adjusted about an axis substantially perpendicular to the axis of the work and intersecting that axis, to alter the angle of the teeth which the cutter will cut on the blank.

13. In a machine for cutting gear teeth, the combination with means for supporting the gear blank to rotate on its own axis, of a cutter adapted to shift back and forth, means for rotating said cutter, a frame on which the cutter is mounted, said frame having a guide along it for guiding the cutter in its motions back and forth, and means whereby said frame can be adjusted about an axis substantially perpendicular to the axis of the work and intersecting that axis, to alter the angle of the teeth which the cutter will cut on the blank.

14. In a machine for cutting gears, the combination of a shaft having means for supporting a gear blank on its end, a vertical shaft, means for operating the vertical shaft, a frame adapted to be turned about the axis of the vertical shaft, a horizontal shaft on the frame adapted to be connected with the vertical shaft to be operated thereby, a slide on said frame, and a vertical cutter shaft carried by said slide and movable by the slide in a plane in which the axis of said vertical shaft is located, whereby the cutter shaft can be moved back and forth in its own plane directly over the said vertical shaft.

15. In a machine for cutting gear teeth, the combination with means for supporting the gear blank to rotate on its own axis, of a toothed cutter, means for supporting said cutter to rotate on its own axis and in a position with the active cutting surfaces of the teeth of the cutter substantially in the plane of the axis of the gear blank, means for traversing the cutter as a whole along the surface of the work blank to control the shape of the teeth cut on the gear blank by its rotation past the edges of the teeth of the cutter, whereby teeth of curved formation will be formed on a conical surface of the blank, and means for reversing the rotation of the cutter shaft and the means for translating the cutter so that the cutter will make its working stroke in the opposite direction.

16. In a machine for cutting gear teeth, the combination with means for supporting the gear blank to rotate on its own axis, of a cutter, means for supporting said cutter to rotate on its own axis, means for traversing the cutter as a whole along the surface of the gear blank during the cutting operation at a definite speed ratio with respect to its rotation, means for automatically disconnecting the traversing means from the power and connecting it up again to operate in the reverse direction at a higher speed for traversing the cutter back after the cutting operation is completed, means for automatically retracting the work blank before the cutter starts back, and means for stopping the operation of the cutter when it gets back to starting position.

17. In a machine for cutting gear teeth, the combination with means for supporting the gear blank to rotate on its own axis, of a cutter, means for supporting said cutter to rotate on its own axis, means for traversing the cutter as a whole along the surface of the work blank, during the cutting operation at a definite speed ratio with respect to its rotation, means for traversing the cutter back after the cutting operation is completed, means for automatically retracting the work blank before the cutter starts back, and means for stopping the operation of the cutter when it gets back to starting position.

18. In a machine for cutting gears, the combination with a shaft arranged to support the work thereon, of a second shaft in a different plane, means for rotating the second shaft at a predetermined ratio to the speed of the work shaft and in either direction, a cutter shaft having an axis at an angle to the axis of the work shaft but not intersecting it, means connected with the second shaft for rotating the cutter shaft on its own axis, a feed screw, means connected with the second shaft for rotating the screw in either direction, and means operated by the screw for moving the cutter shaft bodily along the work.

19. In a machine for cutting gears, the combination with a shaft arranged to support the work thereon and to rotate constantly during the cutting operation, of a shaft in a different plane, means for rotating the second shaft at a predetermined ratio to the speed of the work shaft, a cutter shaft having an axis at right angles to the axis of the work shaft but not intersecting it, means connected with the second shaft for rotating the cutter shaft on its own axis at a lower speed than the work shaft, a feed screw having its axis perpendicular to the axis of the cutter shaft, means connected with the second shaft for rotating the screw, and means operated by the screw for moving the cutter shaft bodily in the direction in which the screw is located.

20. In a machine for cutting gears, the combination with a shaft arranged to support the work thereon, of a second shaft in a different plane, means for rotating the second shaft in either direction, a cutter shaft having an axis at right angles to the axis of the work shaft but not intersecting it, means connected with the second shaft for rotating the cutter shaft on is own axis, a feed screw having its axis perpendicular to the axis of the cutter shaft, means connected with the second shaft for rotating the screws in either direction, means operated by the screw for moving the cutter shaft bodily in the direction in which the screw is located, and means whereby the direction of rotation of the second shaft can be reversed.

21. In a machine for cutting gear teeth of curved formation on a conical surface, the combination with a shaft having means for holding thereon a conical gear blank, of a cutter adapted to turn on an axis perpendicular to the face of the cutter and having teeth thereon adapted to be moved into contact with the gear blank, a frame on which said cutter is mounted, said frame having a nut, a screw passing into said nut, gears arranged to rotate the screw shaft in opposite directions, and means connected with the first-named shaft for operating and reversing the screw.

22. In a machine for cutting gear teeth of curved formation on a conical surface, the combination with a shaft having means for holding thereon a conical gear blank, of a cutter adapted to turn on an axis perpendicular to the face of the cutter and having teeth thereon adapted to be moved into contact with the gear blank to cut teeth thereon in accordance with the rotation of the gear blank, a frame on which said cutter is mounted, said frame having a nut, a screw passing into said nut, the direction of said screw being adjustable to regulate the angle of the cone bounded by the bases of the teeth cut on the gear blank, a helical gear and a worm gear loose on the shaft of said screw, a clutch on said screw shaft for connecting either the helical gear or the worm gear thereto, said gears being arranged to rotate the screw shaft in opposite directions and at different speeds, means connected with the first-named shaft for operating said gears, and means for automatically shifting the clutch when the cutting stroke has been completed and reversing the screw.

23. In a machine for cutting gear teeth, the combination with means for supporting the gear blank to rotate on its own axis, of means for supporting a cutter to turn, a slide for supporting the cutter, means for moving the slide to carry the cutter along the surface of the work blank to control the shape of the teeth cut on the work blank by its rotation past the edges of the teeth of the cutter, whereby teeth of curved formation will be formed on a surface of the blank, hand controlled means for connecting up the slide with its moving means to move the slide in either direction, and automatic means for latching the hand controlled means to hold the connections in position for the forward movement of the slide when the hand-controlled means is placed in position for such motion.

24. In a machine for cutting gears, the combination with a shaft arranged to support the work thereon, of a shaft in a different plane, means for rotating the second shaft at a predetermined ratio to the speed of the work shaft and in either direction, a cutter shaft, a slide on which the cutter shaft is mounted, means connected with the second shaft for rotating the cutter shaft, a screw, means connected with the second shaft for rotating the screw therefrom in either direction, means operated by the screw for moving the slide, hand controlled means for connecting up the slide with the screw to move the slide, automatic means for latching the hand-controlled means to hold the connections in position for the forward movement of the slide when the hand-controlled means is placed in position for such motion, means whereby when the slide moves to the predetermined end of its stroke, said automatic means will be withdrawn and the hand operated means will be free to return, and a spring for returning the hand operated means to a position to reverse the screw.

25. In a machine for cutting gears, the combination with a shaft arranged to support the work thereon, of a shaft, means for rotating the second shaft at a predetermined ratio to the speed of the work shaft and in either direction, a slide, a cutter shaft on the slide, means connected with the second shaft for rotating the cutter shaft, a screw, means connected with the second shaft for rotating the screw in either direction, means operated by the screw for moving the slide in the direction in which the screw is located, a clutch connection for controlling the direction of motion of the slide, a hand lever connected with the last-named means and adapted to be turned to a position to start the slide to move in a direction to form the cut, a spring normally tending to hold the hand lever in the reversing position, an automatic latch for holding the hand lever in the forward cutting position, means operated by the slide for releasing the latch when the slide reaches the end of its stroke, whereby the spring will be free to reverse the feed of the screw, and means on the slide for pulling the hand lever in opposition to the spring to neutral position when the slide moves back.

26. In a machine for cutting gears, the combination with a shaft to support the work, of a shaft, means for rotating the second shaft, a slide, a cutter shaft on the slide having an axis, means connected with the second shaft for rotating the cutter shaft, a screw, means connected with the second shaft for rotating the screw, means operated by the screw for moving the slide, a clutch for reversing the screw, a shaft for operating the clutch, a hand lever on the shaft for operating it, and a latch arranged to engage the hand lever and having a weight which acts automatically to hold the hand lever in position for cutting after it has once been placed in that position.

27. In a gear cutting machine, the combination with means for rotating the gear blank, of a toothed cutter, means for turning the cutter to bring the teeth successively into cutting relationship with the gear blank, a slide on which the cutter is located, means for moving the cutter slide along the gear blank, a reversing device for moving the slide back, a projection on the slide, a bolt, means whereby the projection will withdraw the bolt at the end of the forward stroke of the slide, a second slide, the bolt engaging the second slide to hold it back during the cutting stroke of the cutter slide, whereby the withdrawal of the bolt will release the second slide, and means operated by the second slide for reversing the motion of the cutter slide.

28. In a gear cutting machine, the combination with means for rotating the gear blank, of a toothed cutter, means for turning the cutter to bring the teeth successively into cutting relationship with the gear blank, a slide on which the cutter is located, means for moving the cutter slide along the gear blank at a predetermined angle, a reversing device for moving the slide back after the cut is completed, a projection on the slide, a bolt, means whereby the projection will withdraw the bolt at the end of the forward stroke of the slide, hand operated means for independently withdrawing the bolt at will, a second slide, yielding means for moving the second slide in one direction, the bolt engaging the second slide to hold it back during the cutting stroke of the cutter slide, whereby the withdrawal of the bolt will release the second slide and leave it under the control of said yielding means, and means operated by the second slide when the yielding means moves it, for reversing the motion of the cutter slide.

29. In a gear cutting machine, the combination with means for rotating the gear blank, of a toothed cutter, means for turning the cutter to bring the teeth successively into cutting relationship with the gear blank, a slide on which the cutter is located, means for moving the cutter slide along the gear blank, a reversing device for moving the slide back, a projection on the slide, a bolt, means whereby the projection will withdraw the bolt at the end of the forward stroke of the slide, a second slide, the bolt engaging the second slide, to hold it back during the cutting stroke of the cutter slide, whereby the withdrawal of the bolt will release the second slide and means operated by the second slide for retracting the gear blank out of the path of the cutter when it returns.

30. In a gear cutting machine, the combination with a head stock movable longitudinally, a work shaft mounted thereon to move therewith and having means on its end for supporting a gear blank, and means for rotating the work shaft in all positions of the head stock, of an adjusting screw for the head stock having means thereon for quickly retracting the head stock and the work when the screw is moved bodily in one direction, a hand lever having means for retracting said screw, whereby the work can be withdrawn from cutting position at the will of the operator, and a cutter for operating on the work.

31. In a gear cutting machine, the combination with a longitudinally movable head stock, a work shaft carried thereby and having means for supporting a gear blank at its end, and means for rotating the work shaft in all positions of the head stock, of a sleeve movable in the direction of movement of the head stock and connected therewith, a slide, said slide and sleeve having inter-engaging means for moving the sleeve when the slide is moved to move the head stock back and forth without disconnecting the shaft from the power, and a lever pivoted adjacent to said sleeve and having a projection adapted to engage a groove in the slide for moving the sleeve back and forth to bring the work blank into and out of cutting position.

32. In a gear cutting machine, the combination with a longitudinally movable head stock having a power driven shaft, means for supporting a gear blank, of a sleeve movable in the direction of movement of the head stock and having a slanting groove therein, a slide having a projection entering said groove, whereby the movement of the slide will move the head stock back and forth without disconnecting the shaft from the power, and a hand lever pivoted adjacent to said sleeve and having a projection adapted to engage a groove in the slide for moving the sleeve back and forth to bring the work blank into and out of cutting position.

33. In a gear cutting machine, the combination of a longitudinally movable head stock having means for supporting the gear blank, an adjusting screw for adjusting the head stock back and forth, a sleeve on the adjusting screw, said sleeve having a recess therein located at an inclination, a slide at an angle to the sleeve having a projection entering said sleeve, whereby the motion of the slide will move the sleeve, adjusting screw and head stock bodily back and forth, and means for moving the slide for that purpose.

34. In a gear cutting machine, the combination of a longitudinally movable head stock, a longitudinal work shaft thereon having means for supporting the gear blank on its end, means for rotating the shaft in all positions of the head stock, and adjusting screw for adjusting the head stock back and forth, a sleeve on the adjusting screw, said sleeve having a recess therein located at an inclination, a slide at right angles to the sleeve having a projection entering said sleeve, whereby the motion of the slide will move the sleeve, adjusting screw and head stock bodily back and forth, a spring for moving the slide into a position to retract the head stock and the work, said slide having a slot, a bolt located in said slot for holding the head stock in working position, a lever for pulling back the bolt, and automatic means comprising connections with said bolt for retracting it and allowing the spring to act at a predetermined time in the operation of the machine.

35. In a device for retracting the head stock of a machine of the character described, the combination with a screw for adjusting the head stock, a sleeve mounted on the screw to move the screw bodily and thereby adjust the head stock without turning the screw, said sleeve having an inclined slot, a slide located at right angles to the sleeve and having an inclined projection in the slot, whereby the motion of the slide will move the screw longitudinally, said slide having a transverse groove, a bolt projecting into the groove to hold the slide in one extreme position, a spring connected with the slide to move it to the other extreme position when the bolt is removed, a lever connected with the bolt for retracting it, and yielding means for normally holding the lever in a position to hold the bolt in, of a cutter slide, a cutter for operating on the work carried by said cutter slide, a projection on the cutter slide, and means operated by said projection connected with the last named lever for retracting the bolt when the cutter slide moves to the limit of the cutting stroke, whereby the work will be retracted so that the cutter can move back without engaging it.

36. In a device for retracting the head stock of a machine of the character described, the combination of a screw for adjusting the head stock, means for moving the screw bodily and thereby adjusting the head stock without turning the screw, said means having a transverse groove, a bolt projecting into the groove to hold the slide in one extreme position, a spring connected with the slide to move it to the other extreme position when the bolt is removed, a lever connected with the bolt for retracting it, and yielding means for normally holding the lever in a position to hold the bolt in, a cutter slide, a cutter for operating on the work carried by said cutter slide, a projection on the cutter slide, means connected with the last named lever for retracting the bolt when the cutter slide moves to the limit of the cutting stroke, whereby the work will be retracted so that the cutter can move back without engaging it, the first-named slide also having another transverse groove, and a hand operated bell-crank having a projection extending into the other groove so that the work can be moved forward and back by hand when the bolt is retracted.

37. In a device for retracting the head stock of a machine of the character described, the combination of a screw for adjusting the head stock, means for moving the screw bodily and thereby adjusting the head stock without turning the screw, said means having a transverse groove, a bolt projecting into the groove to hold said means in one extreme position, a spring connected with the slide to move it to the other extreme position when the bolt is removed, a lever connected with the bolt for retracting it, and yielding means for normally holding the lever in a position to hold the bolt in.

38. In a gear cutting machine, the combination with a head stock movable longitudinally, of a work shaft mounted thereon to move therewith and having means on its end for supporting a gear blank, a rod extending through the work shaft, a split arbor on the end of the work shaft for holding the work, means on the rod for expanding said arbor to grip the work in position, a hand lever on the head stock, and means connected with the hand lever for moving the rod in either direction for clamping and unclamping the work.

39. The method of cutting gear teeth, which consists in rotating the blank and a toothed cutter at a predetermined speed ratio on axes at substantially right angles to each other but in different planes, and during the cutting operation, causing a relative motion of translation between the cutter and the blank in such a direction that the axis of the cutter will remain in a plane parallel to an element of the cone bounded by the bases of the teeth to be cut.

40. The method of cutting slanting curved gear teeth, which consists in rotating a blank and a toothed cutter at a predetermined speed ratio on axes at an angle to each other but in different planes so that the cutter acts to cut the teeth in the manner of a lathe tool, and during the cutting operation, moving the cutter relative to the blank in a straight line so as to cause the teeth of the cutter, at all times during the cutting operation, to penetrate the blank up to the base line of the teeth to be cut.

41. The method of making a conical gear or pinion having curved teeth, which consists in rotating the gear blank and a toothed cutter at a predetermined speed ratio on axes at an angle to each other but in different planes, and, during the cutting operation, feeding the cutter along the blank in such a direction that the axis of the cutter will remain in a plane parallel to an element of the cone formed by the bases of the teeth to be cut at a definite speed ratio with respect to the rotation of the cutter.

42. The method of making a conical gear or pinion having curved teeth, which consists in rotating the gear blank and a toothed cutter at a predetermined speed ratio on axes at substantially right angles to each other but in different planes, and, during the cutting operation, feeding the cutter bodily along the blank so as to cause the teeth of the cutter to penetrate the blank up to the base line of the teeth to be cut.

43. The method of making a gear or pinion, which consists in rotating the blank and a circular toothed cutter at a constant speed ratio on axes at an angle to each other but in different planes, and feeding the cutter along the blank with the axis of the cutter in a plane parallel to an element of the cone formed by the bases of the teeth to be cut and at a distance from said cone substantially equal to the radius of the cutter.

44. The method of making a conical gear or pinion having curved teeth, which consists in rotating the gear blank and a toothed cutter on axes at an angle to each other but in different planes, feeding the cutter along the blank so as to cause the teeth of the cutter to penetrate the blank up to the base line of the teeth to be cut, withdrawing the gear, and reversing the direction of motion of the cutter.

45. The method of making a conical gear or pinion having curved teeth, which consists in rotating the gear blank on a substantially horizontal axis and a toothed cutter on a substantially vertical axis at a distance from said horizontal axis, with the active cutting edges of the teeth of the cutter at substantially the level of said horizontal axis, and constantly translating the cutter along the blank in a straight line at an angle to the horizontal axis and parallel to an element of a cone formed by the bases of the teeth to be cut.

46. The method of making a conical gear or pinion having curved teeth, which consists in rotating the gear blank on a substantially horizontal axis and a toothed cutter on a substantially vertical axis at a distance therefrom to permit the cutting operation to be performed by the rotation of the blank in contact with the cutter teeth, and during the cutting operation feeding the cutter along the blank in a straight line inclined to said horizontal axis.

47. As an article of manufacture, a cutter for the purpose described having teeth nearly radial and arranged symmetrically about lines tangent to a concentric circle.

48. As an article of manufacture, a cutter for the purpose described having teeth nearly radial and arranged symmetrically about lines tangent to a concentric circle, the opposite sides of said teeth slanting backwardly with respect to the direction of rotation.

49. As an article of manufacture, a cutter for the purpose described having teeth nearly radial and arranged symmetrically about lines tangent to a concentric circle, the top surface of the cutter being at such an angle as to present a cutting edge with proper tool rake to the surfaces being cut extending to the ends of the teeth, the cutting edges being formed by the intersection of said surface with the sides and ends of the teeth.

50. As an article of manufacture, a cutter for generating gear teeth having cutter teeth formed on involute curves and with their center lines arranged at an angle to the radial.

51. The method of generating gear teeth on a tapered blank, which consists in rotating the gear blank on its own axis, rotating a toothed cutter on its own axis at a predetermined speed ratio, and advancing the cutter simultaneously longitudinally across the work while continuously maintaining its axis in the same angular relation to the axis of the blank, to cut teeth of a spiral order, the cutting edges of said cutter being maintained substantially in a plane which passes through the axis of the work.

52. The method of generating gear teeth on a conical blank, which consists in rotating the gear blank on its own axis, rotating a toothed cutter on its own axis at a predetermined speed ratio, and advancing the cutter simultaneously across the work along an element of the cone to cut tooth spaces of uniform width throughout their length, while maintaining its axis in the same angular relation to the axis of the blank.

53. The method of generating gear teeth, which consists in rotating the blank and a toothed cutter at a predetermined speed ratio on axes at substantially right angles to each other, and during the cutting operation, causing a relative motion of translation between the cutter and the blank in such a direction that the axis of the cutter will remain in the same generating plane.

54. The method of generating slanting curved gear teeth, which consists in rotating a blank and a toothed cutter at a predetermined speed ratio on axes at substantially right angles to each other so that the cutter acts to cut the teeth in the manner of a lathe tool, and during the cutter operation, moving the cutter along the blank.

55. In a gear generating machine, the combination with a blank supporting spindle, a cutter having teeth spaced about its entire periphery adapted to mesh with the teeth to be cut and means for rotating the cutter and gear blank at a predetermined speed ratio, of means for advancing the cutter bodily across the blank simultaneously while maintaining its cutting edges substantially in a plane which passes through the axis of the blank.

56. In a gear generating machine, the combination with a blank supporting spindle, a flat cutter having a plurality of teeth spaced uniformly around its entire edge, and means for rotating the cutter and gear blank at a predetermined speed ratio, of means for advancing the cutter bodily across the blank simultaneously and continuously toward the axis of the blank, at a speed proportional to the speed of rotation of the cutter.

57. In a gear generating machine, the combination with a gear blank supporting spindle, a cutter, and means for rotating the cutter and gear blank at a predetermined speed ratio, and means for advancing the cutter bodily across the blank simultaneously along an element of a conical surface on the blank to form teeth of a spiral order.

58. In a gear cutting machine, the combination with a shaft for rotatably supporting a bevel gear blank, a second shaft having a fixed angular relation to the first mentioned shaft, and a toothed cutter on the second shaft, of means for rotating said shafts at a predetermined ratio, the number of teeth on the cutter and the number of teeth on the finished bevel gear being proportional to the speed ratio.

59. In a gear generating machine, the combination with two shafts for supporting the gear blank and a toothed cutter, of means for bodily moving one of said shafts along the face of the gear blank and change speed gearing for connecting the shafts together, having a speed ratio proportional to the ratio of the number of teeth on the cutter and gear, modified by the pitch arc of the cutter, that rolls on the blank in the course of the bodily movement of the cutter.

60. In a bevel gear generating machine, the combination with a work shaft and a cutter shaft located constantly at right angles to each other of means for rotating said shafts, means for continuously moving the cutter shaft bodily in a direction at right angles to its own axis and toward the axis of the blank, and means for co-ordinating the rotation of said cutter and blank and the bodily movement of said cutter, to cut a gear from a blank having teeth of a spiral order on the work shaft.

61. In a machine for generating gears by the relative bodily movement of the blank and cutter, a combination of means for rotating the blank, a shaft for rotatably supporting the cutter, said shaft being maintained constantly at substantially right angles to the axis of the blank, and means for rotating the cutter and moving the same along the face of the blank in such co-ordinated relation as to cut teeth of a spiral order.

62. In a gear cutting machine a rotatable spindle adapted to support a gear blank, a cutter having a fixed angular relation to said spindle, adapted to cooperate with said blank, and means for simultaneously rotating said spindle and producing relative reciprocatory movements between said cutter and said spindle in a direction having a component longitudinal of said spindle, said means including devices for so interrelating said reciprocatory movements and the rotation of said spindle as to completely form teeth of a spiral order on said blank during a single reciprocatory movement.

63. In a gear cutting machine a rotatable spindle adapted to support a gear blank, a cutter adapted to cooperate with said blank, and means for simultaneously rotating said spindle and producing relative rectilinear movements between said cutter and said spindle in a direction having a component longitudinal of said spindle, said means including devices for so interrelating said rectilinear movements and the rotation of said spindle as to form curved teeth on said blank during a single rectilinear movement.

64. In a gear cutting machine a work supporting spindle adapted to hold a gear blank, a reciprocatory carriage, means for reciprocating said carriage in a direction having a component longitudinal of said spindle, a cutter rotatably mounted on said carriage with its axis in fixed angular relation to said spindle and adapted to cooperate with said gear blank during reciprocation of the carriage, and means for simultaneously rotating said cutter and reciprocating said carriage in such relation as to cut curved teeth in said gear blank, a gear being completely cut during a single reciprocation of said carriage.

65. In a gear cutting machine means for supporting a gear blank, a rotatable cutter adapted to cooperate with said gear blank, the axes of said blank and cutter having a fixed angular relation, means permitting relative reciprocatory movements between said supporting means and said cutter in a direction having a component longitudinal of the axis of said blank, and means for simultaneously rotating said cutter and producing said relative, reciprocatory movements in such relation as to cause said cutter to produce curved teeth in said blank.

66. In a gear-cutting machine means for supporting a gear blank, a rotatable cutter adapted to cooperate with said gear blank, the axes of said blank and cutter having a fixed angular relation, means permitting relative rectilinear movements between said supporting means and said cutter in a direction having a component longitudinal of the axis of said blank, and means for simultaneously rotating said cutter and producing said relative, rectilinear movements in such relation as to cause said cutter to produce curved teeth in said blank, a complete gear being produced during a single relative rectilinear movement.

67. In a gear cutting machine a blank supporting spindle, a cutter mounted adjacent said blank and adapted to cooperate therewith, and means for producing a combined rectilinear and turning movement relatively between said blank and said cutter in such relation as to cause the cutting edge of the latter to cut a curved tooth space across the face and of said blank, the axes of said cutter and spindle being maintained in the same angular relation throughout said movement and said movement having a component longitudinal of the axis of said spindle.

68. In a gear cutting machine means for supporting a conical gear blank, a cutter mounted adjacent said blank and adapted to cooperate therewith, means for permitting a relative to and fro movement between said cutter and blank, the axes of said cutter and blank being maintained in the same angular relation, and the cutting edges of said cutter being maintained substantially in a plane passing through the axis of said blank, and means for producing such relative movement and simultaneously producing a relative turning movement between said cutter and blank in such relation as to cause said cutter to cut a curved tooth space across the face of said blank.

69. In a gear-cutting machine means for supporting a gear blank, a cutter mounted adjacent said blank for cooperation therewith, means for constantly producing relative turning movement between said cutter and blank, and means co-ordinated with said last mentioned means for imparting a relative to and fro movement between said cutter and blank to form teeth of a spiral order on the latter.

70. In a gear cutting machine means for supporting a gear blank, a cutter having teeth adapted for continuous meshing with the teeth to be cut mounted adjacent said blank for cooperation therewith, means for constantly producing relative turning movement between said cutter and blank, and means co-ordinated with said last mentioned means for imparting a relative to and fro movement between said cutter and blank.

71. A method of cutting gear teeth on a blank which comprises simultaneously producing a relative turning movement and a relative rectilinear movement between the blank and a toothed cutter so as to cause said cutter to form curved tooth spaces across the face of said blank, and maintaining the axes of said blank and cutter in the same angular relation throughout said movement and so that a plane passing through said cutter perpendicular to its axis passes through the axis of said blank.

72. A method of cutting gear teeth on a blank which comprises simultaneously producing a relative turning movement and a relative rectilinear movement in a direction having a component longitudinal of the axis of the blank and a relative rectilinear movement between the blank and a cutter having teeth adapted to mesh with the teeth to be cut in said blank, and maintaining the axes of said blank and cutter in the same angular relation throughout said movement.

73. In a machine of the class described a work supporting spindle, a reciprocable cutter adapted to cooperate with the work carried by said spindle, and means controlled by the reciprocatory movement of said cutter for retracting said spindle to carry the work out of cooperation with the cutter during a portion of the movement of the latter.

74. In a machine of the class described a work supporting spindle, a reciprocable cutter adapted to cooperate with the work carried by said spindle, means controlled by the reciprocatory movement of said cutter for retracting said spindle to carry the work out of cooperation with the cutter during a portion of the movement of the latter, and means for independently adjusting said spindle to carry the work toward and away from the path of said cutter.

75. In a gear generating machine, the combination with two shafts for supporting the gear blank and a toothed cutter having teeth adapted for continuous meshing with the teeth to be cut, and means for rotating said shafts, of means for rolling the cutter along the face of the gear blank while it is cutting, and means for modifying the speed ratio of said shafts to compensate for the bodily movement of the cutter.

76. In a gear cutting machine a blank supporting spindle, a rotatable cutter having uniformly spaced teeth, means for rotating said spindle and cutter, means for producing relative bodily movement of said cutter across the face of the blank on said spindle in a direction having a component along the axis of said spindle, said spindle and cutter axis being maintained in the same angular relation, and means for co-ordinating all of said previously recited means to cut a complete set of curved teeth on said blank during one of said relative bodily movements.

77. In a gear cutting machine a spindle for supporting a conical gear blank, a cutter axis mounted for reciprocatory movement in a plane at a definite angle to said spindle, and means for rotating said spindle and axis and for reciprocating the latter, said means including devices for so co-ordinating said rotary and reciprocatory movements as to cut a complete spiral bevel gear during a single reciprocation of said axis.

78. In a gear cutting machine a rotatable work supporting spindle, a rotatable cutter axis, a cutter thereon having its cutting edges substantially in a plane perpendicular to said axis, means for producing a relative transverse movement between said spindle and axis in a plane forming an acute angle with said spindle, and means for co-ordinating said previously recited means to cut a complete gear during a single relative transverse movement between said spindle and axis.

79. In a machine for generating the teeth of a gear, means for supporting and constantly rotating a conical gear blank, means for rotating at a constant ratio thereto a gear cutter having a plurality of cutting teeth uniformly spaced around the periphery of said cutter in substantially the same plane, said teeth being adapted to continuously mesh with the teeth cut thereby, and automatic means for reciprocating the cutter bodily along the conical surface of the gear blank while maintaining a constant angular relation between the axes of said cutter and blank.

80. In a bevel gear generating machine a work shaft for supporting a conical gear blank and a cutter shaft maintained constantly at right angles to each other, means for rotating said shafts at predetermined relative speeds, means for moving the cutter shaft bodily at right angles to its axis and in a plane intersecting the axis of the work shaft at an acute angle, and means for co-ordinating the rotation of said shafts and the bodily movement of said cutter shaft to cut a gear having teeth of a spiral order from said blank.

81. In a machine for generating gear teeth, a work supporting spindle, a cutter mounted on an axis maintained at a constant angle to said spindle, said cutter having cutting edges substantially in a plane, said plane passing longitudinally through said spindle, means for rotating said spindle and cutter at predetermined relative speeds, and means for bodily shifting said cutter parallel to said plane.

82. In a machine for generating spiral bevel gear teeth, a work supporting spindle, a cutter mounted on an axis maintained at a constant angle to said spindle, said cutter having cutting edges substantially in a plane, said plane passing longitudinally through said spindle, means for rotating said spindle and cutter at predetermined relative speeds, and means for bodily shifting said cutter parallel to said plane to cut teeth of a spiral order on a blank carried by said spindle.

83. In a gear generating machine a work shaft adapted to support a blank, a toothed cutter having its axis at an angle to the axis of the work shaft, means for rotating said shaft and cutter at predetermined relative speeds, and means for advancing the cutter slowly across the face of the blank, successive teeth on the cutter moving through successive tooth spaces on the blank to effect the cutting action and a complete gear being cut during a single advance of the cutter across the face of the blank.

In testimony whereof I have hereunto affixed my signature.

ERNEST L. FICKETT.